C. A. PARSONS.
TURBINE.
APPLICATION FILED AUG. 25, 1909.

972,907.

Patented Oct. 18, 1910.
6 SHEETS—SHEET 2.

ATTEST.
Benj. W. Stahl
Edward N. Saxton

INVENTOR.
CHARLES A. PARSONS.
By Spear, Middleton, Donaldson & Spear
ATT'YS

THE NORRIS PETERS CO., WASHINGTON, D. C.

C. A. PARSONS.
TURBINE.
APPLICATION FILED AUG. 25, 1909.

972,907.

Patented Oct. 18, 1910.
6 SHEETS—SHEET 3.

ATTEST.
Bent M. Stahl
Edward N. Sartin

INVENTOR,
CHARLES A. PARSONS,
By Spear, Middleton, Donaldson & Spear
Atty's

THE NORRIS PETERS CO., WASHINGTON, D. C.

C. A. PARSONS.
TURBINE.
APPLICATION FILED AUG. 25, 1909.

972,907.

Patented Oct. 18, 1910.
6 SHEETS—SHEET 5.

ATTEST.

INVENTOR.
CHARLES A. PARSONS

C. A. PARSONS.
TURBINE.
APPLICATION FILED AUG. 25, 1909.

972,907.

Patented Oct. 18, 1910.

ATTEST,
Bertha Stahl
Edward N. Santur

INVENTOR,
CHARLES A. PARSONS.
By Spear, Middleton, Donaldson & Spear
ATT'YS

THE NORRIS PETERS CO., WASHINGTON, D. C.

UNITED STATES PATENT OFFICE.

CHARLES ALGERNON PARSONS, OF NEWCASTLE-UPON-TYNE, ENGLAND.

TURBINE.

972,907.  Specification of Letters Patent.  Patented Oct. 18, 1910.

Application filed August 25, 1909.  Serial No. 514,594.

*To all whom it may concern:*

Be it known that I, CHARLES ALGERNON PARSONS, C. B., a subject of the King of Great Britain and Ireland, and residing at Heaton Works, Newcastle-upon-Tyne, in the county of Northumberland, England, have invented certain new and useful Improvements Relating to Turbines, of which the following is a specification.

This invention relates to improvements in partial admission turbines of the type having rotating blades of the Parsons' type and segments of guide blades also of the Parsons' type, having short end blockings which turbines are divided into separate elements having drums working in separate chambers in each of which only a very small drop of pressure occurs.

In partial impingement turbines of the type above mentioned the working fluid has hitherto been passed only once through any of the rings of rotating blades, consequently though the construction enables the length of the high pressure blades to be considerably increased over that required for a complete admission turbine for the same duty and avoids serious spilling and skin friction losses, the length of the turbine may not be much less than that of a complete admission turbine with Parsons' rotating and guide blades.

The object of the present invention is to provide a construction of partial admission turbine of the character above mentioned which shall enable the length and weight of the turbine to be considerably reduced but shall still retain the features of the previous construction by which serious skin friction and steam spilling losses are avoided.

The invention consists in a partial admission turbine of the character above referred to in which the segmental guides are arranged to pass working fluid from one or more admission ways two or more times through the rotating blades in one or more of the separate chambers, only a small pressure drop being permitted in each of the chambers.

The invention further consists in a partial admission turbine of the character set out in the preceding paragraph in which turbine the working fluid after being passed by a passageway once through the rotating blades of the turbine is guided outward and over the blades to the inlet side of the wheel and is again passed through the same rotating blades by another passageway, this action being repeated if desired and the working fluid either delivered through a partition for further expansion in another motor element or delivered freely into the same chamber and allowed to pass thence by one or more passageways through the same rotating blades one or more times in the same direction as before and then delivered through the partition wall for further expansion.

In all forms of the present invention the drop of pressure which occurs in any single chamber must not exceed the amount occasioned by an expansion in any chamber of about four volumes; but it is preferably still smaller, say that occasioned by an expansion in any chamber of only two volumes or even less.

I am aware of course that turbines have often been proposed in which the steam operates several times upon one disk or row of blades but such turbines have not been successful for several reasons, one being that by the constructions proposed the leakage has always been excessive, and another being that the drop of pressure dealt with on the disk or wheel has been so considerable as to involve serious loss in condensation and reevaporation upon the moving blades. By the present invention however these prime causes of failure are removed.

The invention further consists in carrying the segmental guides by covers removably attached to the turbine casing in order that the working blades and guides may be readily inspected when desired without breaking the main joint of the casing and lifting the latter.

The invention further consists in the constructions and arrangements of partial admission turbines hereinafter described.

Referring now to the accompanying diagrams.

Figure 1:
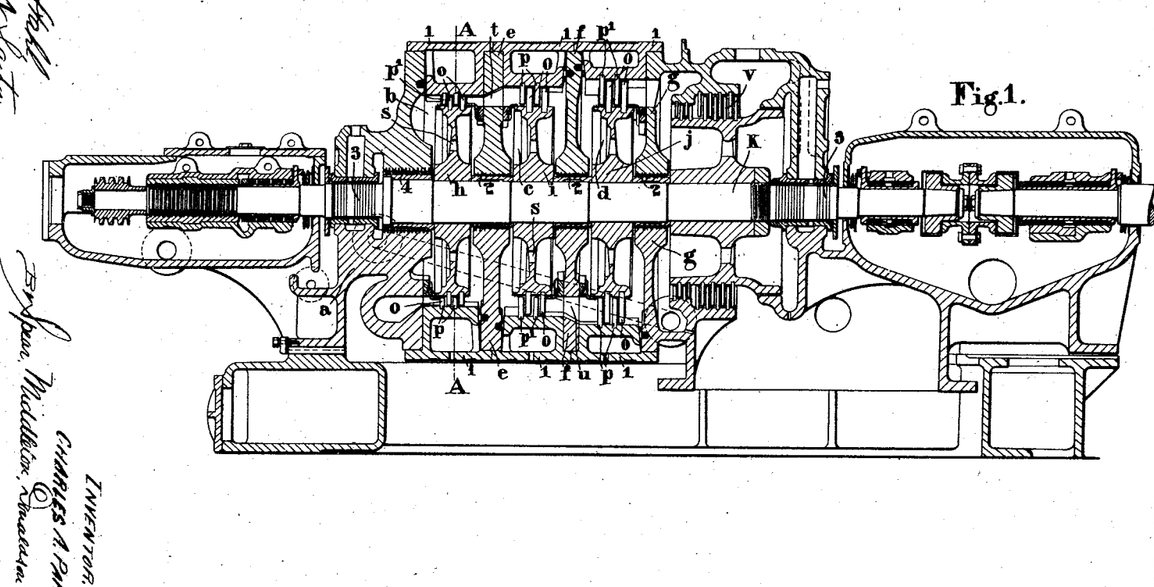
—Figure 1 is a sectional elevation of a turbine constructed according to one form of the invention, the steamways being represented in a vertical central plane although they are preferably made on a sloping plane as shown in Fig. 2 which is a cross sectional view on the line A—A of Fig. 1, the supporting parts of the casing being omitted.
Figure 2:
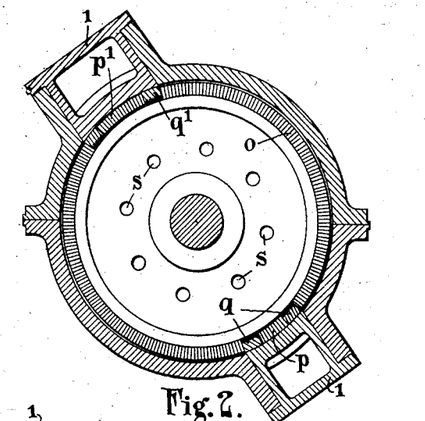
Figures 6, 7:
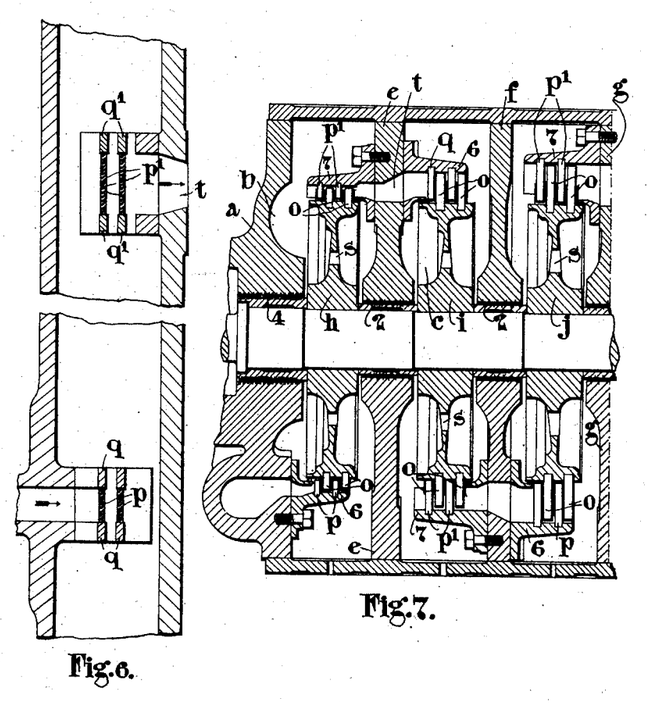
Fig. 6 is a developed view to an enlarged scale of the casing shown in Fig. 1 in order to represent the arrangement of the segmental guides. This view is of course diagrammatic only, the proportions not being strictly in accordance with the previously mentioned figures.
Fig. 7 is a vertical section of a portion of a modified construction of turbine of the general character shown in Fig. 1.

In carrying this invention into effect according to the construction shown in Fig. 1, the turbine $a$ is divided into a number of short chambers, $b$ $c$ and $d$, by partition walls, $e, f, g$. The number of chambers employed depends upon the total pressure drop which it is desired that the partial admission turbine shall deal with, the number being of course large if the total pressure drop is large and small if the total pressure drop is small. Inclosed in these chambers are rotary drums, $h$ $i$ and $j$, which are mounted on the turbine spindle, $k$. Each drum carries a few—say two—rings of blades, $o$, of the Parsons' type and the casing carries segments of guide blades, $p$, of the Parsons' type terminating in short end blockings, $q$. The elastic working fluid (hereinafter referred to as steam), after passing through the passageway formed by the segmental guides and blockings, $p, q$, however, instead of passing directly to the next wheel as in previous constructions, is delivered directly into the free space of the chamber $b$, whence it passes over the rotating blades of the wheel and, if desired, through holes, $s$, therein back to the front side of the wheel so that the wheel rotates immersed in the steam discharged freely into the chamber, $b$, from the first steamway. From the front side of the chamber the steam then passes again through the running blades of the same wheel but by way of another passageway formed by similar but larger blade segments, $p'$, with end blockings, $q'$, (see Fig. 6) this steamway forming the delivery from the chamber, $b$, to a port, $t$, in the partition wall, $e$. The port, $t$, leads to the entrance of a passageway of increased sectional area in the next chamber, $c$, which is at less pressure than the first chamber, this passageway being formed in the same manner as the first passageway of the chamber $b$, viz., by segmental guides, $p$, with short end blockings. After the steam has passed through the first passageway of chamber, $c$, it is delivered freely into that chamber whence it passes to the front of the wheel, $i$, and enters a second but still larger passageway formed by end blocked sectors, $p'$, whereby the steam is delivered to a port, $u$, in the partition wall, $f$. The port, $u$, delivers the steam into the first steamway of the next chamber, $d$, in which it is dealt with in the same manner as in chambers, $b$, and $c$. After leaving the second passageway of the chamber, $d$, the steam may pass into an annular admission turbine, $v$.

Figure 3:
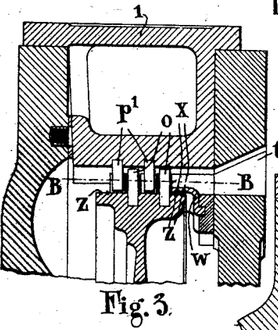
Figs. 3 and 4 are views of the segment-carrying cover and the upper part of the first wheel and chamber shown respectively in Figs. 1 and 2.

The front or steam inlet side of each chamber is screened off from the steam inlet by labyrinth sector and ring packings or similar devices; the other side of the chamber is screened off in a similar manner from the outlet. This may be arranged as shown in Figs. 1 and 3 where the labyrinth sector packings $x$ are carried by a segmental flange $w$, the rings, $z$, being of course carried upon the drum. The rows of moving blades are arranged as closely as possible to the guide sectors in order to avoid unnecessary clearance for steam spilling to occur in the chamber.

It will be understood that the high pressure portion of the turbine may be divided into as many partial admission turbine elements of the character herein described as is desired so long as the pressure drop per element is at most only moderate. The partial admission portions may be arranged in casings entirely separated from one another and the low pressure portion of the turbine may be arranged in a separate casing; or an annular low pressure portion may be included with the high pressure partial admission portion.

The parts where the spindle of the turbine passes through the various chambers are suitably packed preferably by labyrinth packings, 2, the usual labyrinth packings, 3, 3, being provided at the ends of the turbine.

End balancing of the steam thrust may be obtained by the steam pressure on the differences of cross sectional area of the spindle where it passes through the end casings and partitions. When a low pressure annular admission turbine with a dummy is used in conjunction with a partial admission turbine the dummy may be made larger than is necessary for balancing the low pressure turbine, the excess thrust being utilized to assist the balancing of the partial impingement turbine. A balancing force may be supplied also by a small dummy piston, 4, at the steam inlet side of the turbine.

Figure 4:
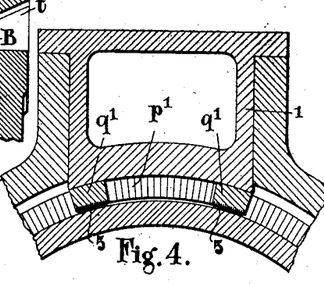
Figure 5:
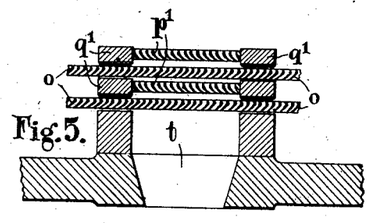
Fig. 5 is a developed sectional diagram on the line B—B of Fig. 3 but with only a few of the two rows of working blades shown.

The stops or end-blockings at each side of the guide sectors are wider than the guide blades and they lie very close to the moving blades in the longitudinal direction. These stops or end-blockings are preferably fitted with thin strips of brass, 5, 5, as shown in Fig. 4 on the inside diameter next to the revolving wheels and they only extend a short distance circumferentially; over the remainder of the circumference the disks or wheels and their blades rotate with large clearance whereby excessive skin friction is avoided.

Any of the wheels may be provided with more than one steam admission passage and separate or coupled controlling valves may be provided in one or more of the passages in order that a large range of power variation may be easily obtained.

The fixed guide sectors and end blockings are preferably carried upon the movable covers, 1, the sides of which may be slightly tapered as shown in Fig. 3 in order to facilitate the construction and enable the blades and guides of the turbine to be examined at any time without raising the casing of the turbine. In a modification of the invention however, the end-blocked guide sectors, $p$ and $p'$, are carried by castings, 6, 7, secured to the walls as shown for example in Fig. 7.

Instead of passing the steam only once through the rotating blades of any wheel before discharging it openly into the chamber and then only once more through the rotating blades before passing it to the first passageway of the next chamber, I may pass the steam more than once through the rotating blades before delivering it freely into the chamber and more than once more before passing it to the first passageway of the next chamber. The steam may thus be passed four or more times through the same rows of working blades of each wheel; but it is important in all forms of the invention that the total amount of expansion which occurs in any chamber, that is the expansion which occurs between the first sector of guides of the first steamway and the end of the passageway which leads the steam to the first passageway of the next chamber shall not exceed about four volumes—indeed it is preferable that the expansion shall only be about half this amount or even less—so that the drop in pressure which occurs per wheel element or chamber shall not be enough to produce serious spilling losses at the sides of the rows of rotating blades, or to occasion substantial loss by condensation and reëvaporation consequent upon the rotating blades passing alternately across a steam way and into the large space of the chamber. The number of rows of rotating blades therefore in any chamber when steam is passed several times through the same rotating blades should be kept small; even a single row of rotating blades may be used if desired though I generally prefer to employ two or three rows, although more may be employed if desired.

An arrangement with two rows of rotating blades per wheel with steam passing four times through the same working blades is represented in Figs. 8 to 15 which illustrate the high pressure turbine divided into three wheel elements in three closed chambers, $b$, $c$ and $d$. A casting, 8, carries opposite to the steam inlet to the chamber the first sector of guides, $p$, in front of the first row of rotating blades, $o$, a similar sector of guides being carried in front of the second row of rotary blades, these guide sectors forming the first steamway. After the steam has been passed by these guides once through the two rows of rotating blades it is directed by a curved passage, 9, radially outward, over the ends of the running blades and thence inward to a space, 10, at the front of the wheel. From the space, 10, steam passes in the same direction as before through sectors or guides $p'$, $p'$, and the alternating rows of rotating blades $o$, $o$, after which it is delivered freely into the chamber.

Figure 8:
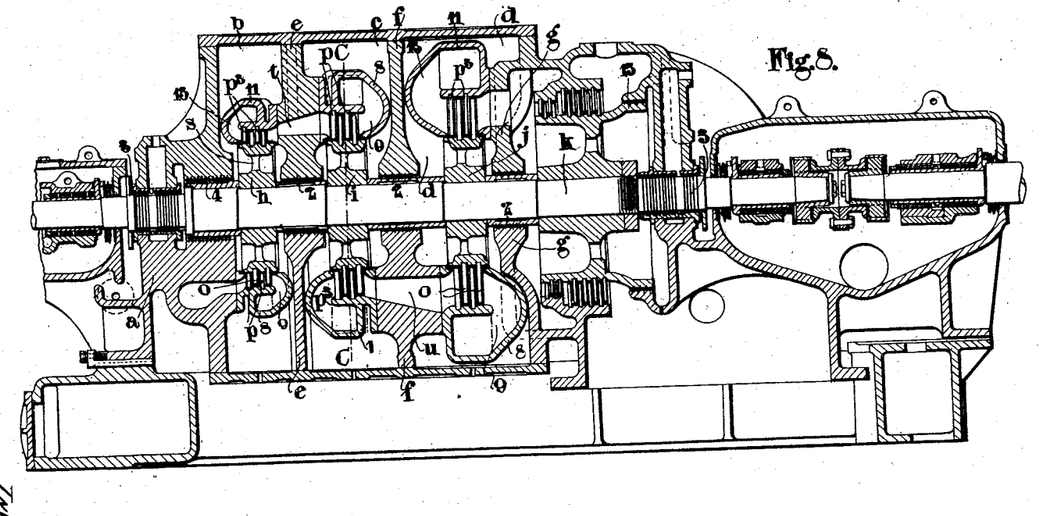
Fig. 8 is a vertical sectional view of a further modification of the invention in which the working fluid is passed by curved passageways twice before it is delivered freely into the chamber and is again passed twice through the same working blades from the chamber before passing into the next chamber.
Figure 9:
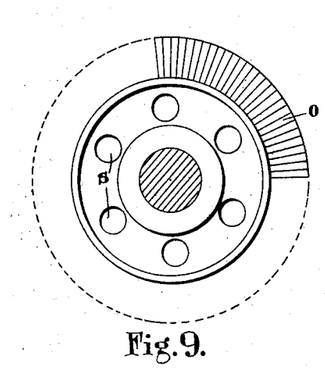
Fig. 9 is a detached view of the middle partial admission wheel shown in Fig. 8.
Figure 10:
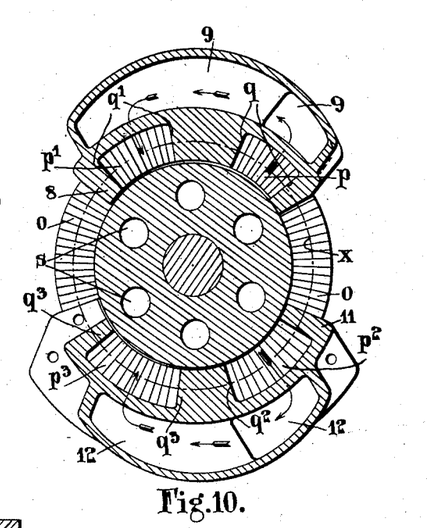
Fig. 10 is a vertical section on the line C—C of Fig. 8 showing the wheel and directing passages.
Figure 11:
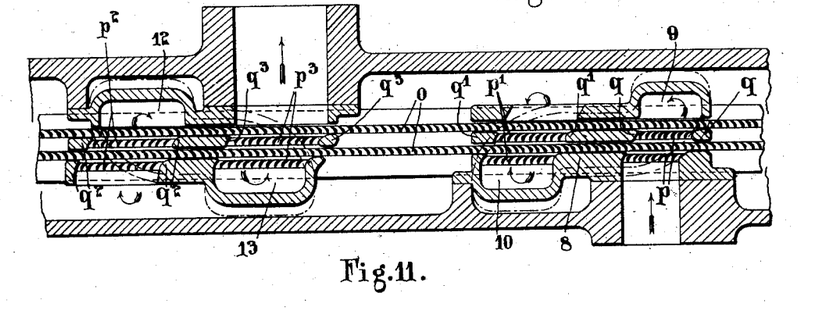
Fig. 11 is a developed view of the guide devices and blades taken on the dotted circle X of Fig. 10.
Figure 12:
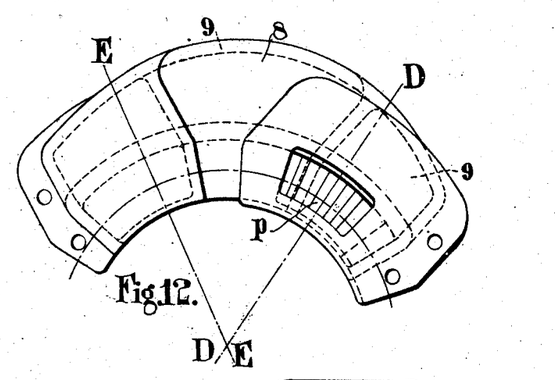
Fig. 12 is a detached front view of the steam-directing casting shown at the top of the middle wheel in Fig. 8.
Figure 13:
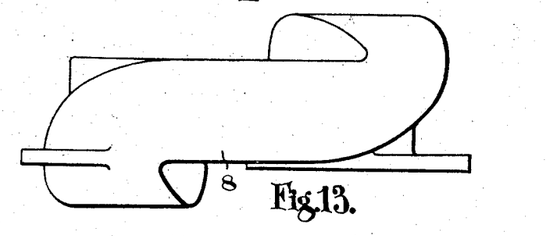
Fig. 13 is a plan of the same.
Figure 14:
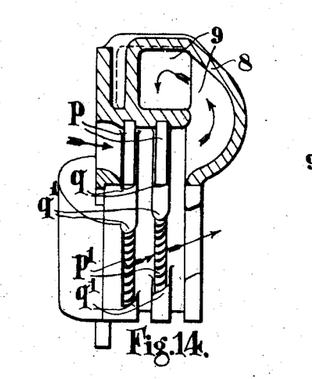
Figs. 14 and 15 are sectional views on the lines D—D and E—E respectively of Fig. 12.
Figure 15:
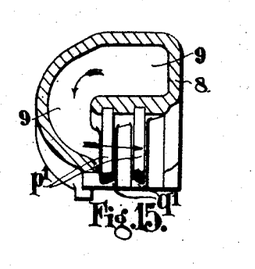

To the partition wall opposite that which carries the casting, 8, there is secured another somewhat similar casting, 11, which carries two sectors of guides, $p^2$, $p^2$, alternating with the same rotating blades, $o$, $o$, and forming a steamway through which the working fluid from the chamber passes in the same direction as before, being then delivered into the passage, 12, which conducts it radially outward over the ends of the blades and inward to a space, 13, at the front of the wheel. The space 13, opens to a steamway through the guide sectors, $p^3$, $p^3$, which alternate with the same row of rotating blades, $o$, $o$ and form a steamway opening opposite to a port, $t$, which opens to a casting in the next chamber corresponding to the casting, 8. The end blockings $q$, $q'$, $q^2$ and $q^3$ may be formed upon or in one with the castings, 8 and 11, or they may be made separately and secured to these castings in any convenient manner.

The pressure in the chamber is approximately a mean between the pressure of the fluid passing through the first sector of guides, $p$, and the last sector of guides $p^3$. The high pressure part of the turbine may be divided into as many of these chambers as is desired, but it is preferable to complete the expansion of the steam in an annular admission turbine, such for example as that shown in Fig. 8, which turbine may be provided with a balancing piston, 15, of large enough diameter to balance its own steam thrust only, or some of that occasioned by the steam in the partial admission elements.

In a modification of the invention the sectors forming the passageways may be arranged in cast carrying means in such a manner that the steam shall be passed more than twice through the rotating blades before it is delivered freely into the chamber.

Instead of delivering the steam freely into the chamber after it has passed more than once through the rotating blades as shown in Figs. 8 to 14, the steam may be passed directly into the first steamway of the next chamber, the casting 8, being then formed with its discharge passage opening opposite a port in the partition wall which separates the chambers. The steam which spills into the chamber from the first steamway will be drawn into a lower pressure part of the last steamway of the same chamber.

In a modified form of the invention the steam, after being discharged freely into the chamber, instead of being passed twice more through the rotating blades may be passed only once more through the rotating blades by a single passageway which opens opposite a port in the partition wall separating this chamber from the next.

The steam is always passed through the working blades in the same direction, this being necessary on account of the formation of the rotating blades.

The steam pressure in any chamber being approximately a mean between the inlet pressure at the first sector and the outlet pressure at the last sector, some leakage will occur into the chamber at parts of a passageway which are at higher pressure than that in the chamber proper and a suction action will be produced on the chamber proper by the steam at lower pressure in parts of the passageway taking steam from the chamber.

A turbine according to this invention may be used conveniently for marine purposes and is especially suitable as a cruising turbine although it may advantageously be used for land work also.

When the invention is used for marine purposes it is preferably arranged to operate in series with annular admission turbines, the whole or part of the cruising element of the plant consisting of partial admission turbines according to the invention; in some cases however the whole expansion of the steam may be effected in the partial admission turbines though it is generally preferable to utilize them only for the higher stages of the steam expansion.

Having now described my invention what I claim as new and desire to secure by Letters Patent is:—

1. A turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy of the working fluid into means whereby the working fluid is passed more than once in the same direction through the same reaction means.

2. A turbine having a number of successive stages each of which comprises a plurality of means for fractionally converting the pressure energy of the working fluid into kinetic energy, a rotor, reaction means carried by said rotor and interposed between said converting means for transforming said kinetic energy into mechanical energy while further converting said pressure energy into kinetic energy and means whereby the working fluid is passed more than once in the same direction through the same reaction means.

3. A turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy, said converting means only partly extending over said reaction means, and means whereby the working fluid is passed more than once in the same direction through the same reaction means.

4. A turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy; said converting means only partly extending over said reaction means and terminating in short end blockings to form impingement zones, and means whereby the working fluid is passed more than once in the same direction through the same reaction means.

5. A turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy, said converting means only partly extending over said reaction means and terminating in short end blockings to form impingement zones which gradually increase in cross sectional area in the direction of flow of the fluid through the turbine, and means whereby the working fluid is passed more than once in the same direction through the same reaction means.

6. A turbine having a number of successive stages each of which comprises a plurality of means for fractionally converting the pressure energy of the working fluid into kinetic energy, a rotor, reaction means carried by said rotor and interposed between said converting means for transforming said kinetic energy into mechanical energy while further converting some of said pressure energy into kinetic energy, said converting means extending only over a part of said reaction means, and means whereby the working fluid is passed more than once through the same reaction means before passing to the next stage of the turbine.

7. A turbine having a number of successive stages each of which comprises a plurality of means for fractionally converting the pressure energy of the working fluid into kinetic energy, a rotor, reaction means carried by said rotor and interposed between said converting means for transforming said kinetic energy into mechanical energy while further converting some of said pressure energy into kinetic energy, said converting means extending only over a part of said reaction means and terminating in short end blockings to form two or more impingement zones, and means whereby the working fluid is passed more than once through the same reaction means before passing to the next stage of the turbine.

8. A turbine having a number of successive stages each of which comprises a plurality of means for fractionally converting the pressure energy of the working fluid into kinetic energy, a rotor, a reaction means carried by said rotor and interposed between said converting means for transforming said kinetic energy into mechanical energy while further converting some of said pressure energy into kinetic energy, said converting means extending only over a part of said reaction means and terminating in short end blockings to form two or more impingement zones which increase gradually in cross sectional area toward the exhaust end of the turbine, and means whereby the working fluid is passed more than once through the same reaction means before passing to the next stage of the turbine.

9. A turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy, and means whereby the working fluid after having passed once through the converting means and reaction means is delivered freely into the stage chamber and is delivered from thence and again passed through the same reaction means before being delivered to the next turbine stage.

10. A turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy; said converting means only partly extending over said reaction means and terminating in short end blockings to form impingement zones, means whereby the working fluid after having passed once through the converting means and reaction means is delivered freely into the stage chamber and is delivered from thence and again passed through the same reaction means before being delivered to the next turbine stage.

11. A turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy, said converting means only partly extending over said reaction means and terminating in short end blockings to form impingement zones which gradually increase in cross sectional area in the direction of flow of the fluid through the turbine, means whereby the working fluid after having passed once through the converting means and reaction means is delivered freely into the stage chamber and is delivered from thence and again passed through the same reaction means before being delivered to the next turbine stage.

12. A turbine having a number of successive stages each of which comprises a plurality of means for fractionally converting the pressure energy of the working fluid into kinetic energy, a rotor, reaction means carried by said rotor and interposed between said converting means for transforming said kinetic energy into mechanical energy while further converting some of said pressure energy into kinetic energy, said converting means extending only over a part of said reaction means, and means whereby the working fluid after having passed once through the converting means and reaction means is delivered into the chamber in which the rotor rotates and is then delivered from thence to the inlet side of and passed again through the same reaction means before being delivered to the next turbine stages.

13. A turbine having a number of successive stages each of which comprises a plurality of means for fractionally converting the pressure energy of the working fluid into kinetic energy, a rotor, reaction means carried by said rotor, and interposed between said converting means for transforming said kinetic energy into mechanical energy while further converting some of said pressure energy into kinetic energy said converting means extending only over a part of said reaction means and terminating in short end blockings to form two or more impingement zones which increase gradually in cross sectional area toward the exhaust end of the turbine and means whereby the working fluid after having passed once through the converting means and reaction means is delivered into the chamber in which the rotor rotates and is then delivered from thence to the inlet side of and passed again through the same reaction means before being delivered to the next turbine stage.

14. A turbine having a number of stages each of which comprises a plurality of means for fractionally converting the pressure energy of the working fluid into kinetic energy, reaction means interposed between said converting means for transforming said kinetic energy into mechanical energy while further converting said pressure energy into kinetic energy and means comprising passages leading from the outlet side of said reaction means to the inlet side of said converting means whereby the working fluid is passed more than once through the same reaction means before being delivered to the next stage of the turbine.

15. A turbine having a number of stages each of which comprises a plurality of means for fractionally converting the pressure energy of the working fluid into kinetic energy, reaction means interposed between said converting means for transforming said kinetic energy into mechanical energy while further converting said pressure energy into kinetic energy, said converting means extending only over a part of said reaction means and terminating in short end blockings to form two or more impingement zones, and means comprising passages leading from the outlet side of said reaction means to the inlet side of said converting means whereby the working fluid is passed more than once through the same reaction means before being delivered to the next stage of the turbine.

16. A turbine having a number of stages each of which comprises a plurality of means for fractionally converting the pressure energy of the working fluid into kinetic energy, reaction means interposed between said converting means for transforming said kinetic energy into mechanical energy while further converting said pressure energy into kinetic energy and means comprising passages leading from the outlet side of said reaction means to the inlet side of said converting means whereby the working fluid after having been passed once through the converting means and reaction means is passed again by way of said passages through the same reaction means and in the same direction and then delivered into the chamber containing said reaction means and then passed again through the same reaction means before being delivered to the next stage of the turbine.

17. A turbine having a number of stages each of which comprises a plurality of means for fractionally converting the pressure energy of the working fluid into kinetic energy, reaction means interposed between said converting means for transforming said kinetic energy into mechanical energy while further converting said pressure energy into kinetic energy, said converting means extending only over a part of said reaction means and terminating in short end blockings to form two or more impingement zones, whereby the working fluid after having been passed once through the converting means and reaction means is passed again by way of said passages through the same reaction means and in the same direction and then delivered into the chamber containing said reaction means and then passed again through the same reaction means before being delivered to the next stage of the turbine.

18. A turbine having in combination a casing, partitions dividing said casing into a number of compartments, a rotor in each compartment, means in each compartment for fractionally converting the pressure energy of the fluid into kinetic energy, reaction means carried by said rotor and interposed between said converting means for transforming said kinetic energy into mechanical energy while further converting the pressure energy of the fluid into kinetic energy, said converting means only extending over a part of said reaction means and terminating in short end blockings to form two or more impingement zones means attached to said partitions said means having a passage formed therein leading from the last of the reaction means to the first of the converting means forming the next impingement zone whereby the working fluid after having been passed once through said converting means and reaction means is guided up and over the same by said passages to the inlet side of said means and again passed in the same direction as before through the same reaction means this being repeated as often as desired before the fluid is delivered to the next compartment.

19. A turbine having in combination a casing, partitions dividing said casing into a number of compartments a rotor in each compartment means in each compartment for fractionally converting the pressure energy of the fluid into kinetic energy, reaction means carried by said rotor and interposed between said converting means for transforming said kinetic energy into mechanical energy while further converting the pressure energy of the fluid into kinetic energy, said converting means only extending over a part of said reaction means and terminating in short end blockings to form two or more impingement zones, means attached to said partitions said means having a passage formed therein leading from the last of the reaction means to the first of the converting means forming the next impingement zone whereby the working fluid after having been passed once through said converting means and reaction means is guided up and over the same by said passages to the inlet side of said means and again passed in the same direction through the same reaction means and then exhausted freely into the chamber containing the same rotor, the fluid thereafter being passed through more of said passages which deliver it to be passed again in the same direction through the same reaction means before being passed to the next turbine compartment.

20. A turbine having in combination a casing, partitions dividing said casing into a number of compartments a rotor in each compartment, means in each compartment for fractionally converting the pressure energy of the fluid into kinetic energy, reaction means carried by said rotor and interposed between said converting means for transforming said kinetic energy into mechanical energy while further converting the pressure energy of the fluid into kinetic enery said converting means only extending over a part of said reaction means and terminating in short end blockings to form two or more impingement zones means attached to said partitions said means having a passage formed therein leading from the last of the reaction means to the first of the converting means, whereby the working fluid is passed more than once through the same reaction means and always in the same direction and exhausted freely into the rotor compartment after having passed through said reaction means before being delivered from the reaction means to the next turbine compartment.

21. A turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy and means whereby the working fluid is passed more than once in the some direction through the same reaction means an annular admission turbine in which the working fluid exhausted from the first turbine is further expanded.

22. In combination with a turbine having a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy and means whereby the working fluid is passed more than once in the same direction through the same reaction means, an annular admission turbine of the Parsons' type in which turbine the working fluid is further expanded.

23. A turbine having a number of stages each formed within a common casing, partitions separating each stage into separate chambers, each stage comprising a plurality of means for fractionally converting the pressure energy of the working fluid into kinetic energy, a rotor in each chamber, reaction means carried by said rotor and interposed between said converting means, said reaction means transforming said kinetic energy into mechanical energy while further converting the pressure energy of the fluid into kinetic energy said converting means extending only over a part of said reaction means and terminating in short end blockings so as to form sectors having two or more impingement zones, while the sectors are themselves attached to the turbine casing and means whereby the working fluid is passed several times through the same reaction means and in the same direction.

24. A turbine having a plurality of stages each formed within a common casing, partitions separating each stage into separate chambers, each stage comprising a plurality of means for fractionally converting the pressure energy of the working fluid into kinetic energy, a rotor in each chamber, reaction means carried by said rotor and interposed between said converting means, said reaction means transforming said kinetic energy into mechanical energy while further converting the pressure energy of the fluid into kinetic energy, said converting means extending only over a part of said reaction means and terminating in short end blockings so as to form sectors having two or more impingement zones, while the sectors themselves are attached to the partitions, and means whereby the working fluid is passed several times through the same reaction means and in the same direction.

25. A turbine having a number of stages each formed within a common casing, partitions separating each stage into separate chambers, each stage comprising a plurality of means for fractionally converting the pressure energy of the working fluid into kinetic energy, a rotor in each chamber reaction means carried by said rotor and interposed between said converting means, said reaction means transforming said kinetic energy into mechanical energy while further converting the pressure energy of the fluid into kinetic energy said converting means extending only over a part of said reaction means and terminating in short end blockings so as to form sectors having two or more impingement zones, removable covers attached to said turbine casing for carrying said sectors of reaction means and means whereby the working fluid is passed several times through the same reaction means and in the same direction.

26. A turbine having in combination a casing, partitions dividing said casing into a number of compartments, a plurality of sectors of fixed guide blades of the Parsons' type within each compartment, a rotor element in each of said compartments, a plurality of rows of Parsons' type blading carried by said rotor and interposed between said fixed sectors and means whereby the working fluid is passed more than once in the same direction through the same rotating blading.

27. A turbine having in combination a casing, partitions dividing said casing into a number of compartments, a plurality of sectors of fixed guide blades of the Parsons' type within each compartment a rotor element in each of said compartments, a plurality of rows of Parsons' type blading carried by said rotor and interposed between said fixed sectors, short end blockings at each side of said sectors of guide blades to form two or more impingement zones and means whereby the working fluid is passed more than once in the same direction through the same rotating blading.

28. A turbine having in combination a casing, partitions dividing said casing into a number of compartments, a plurality of sectors of fixed guide blades of the Parsons' type within each compartment, a rotor element in each of said compartments, a plurality of rows of Parsons' type blading carried by said rotor and interposed between said fixed sectors short end blockings at each side of said sectors of guide blades to form two or more impingement zones which increase gradually in cross sectional area in the direction of flow of the working fluid and means whereby the working fluid is passed more than once in the same direction through the same rotating blading.

29. A turbine having in combination a casing, partitions dividing said casing into a number of compartments, a plurality of sectors of fixed guide blades of the Parsons' type within each compartment, a rotor element in each of said compartments, a plurality of rows of Parsons' type blading carried by said rotor and interposed between said fixed sectors and means whereby the working fluid is passed more than once in the same direction through the same rotating blading, and an annular admission reaction turbine in which the working fluid is further expanded.

30. A turbine having in combination a casing, partitions dividing said casing into a number of compartments, a plurality of sectors of guide blades of the Parsons' type, detachable covers carried by said casing and holding said guide blade sectors in position a rotor element in each of said compartments, a plurality of Parsons' type blading carried by said rotors and interposed between said fixed guide blade sectors and means whereby the working fluid is passed more than once in the same direction through the same rotor blades.

31. A turbine having in combination a casing, partitions dividing said casing into a number of compartments, a plurality of sectors of guide blades of the Parsons' type, carried by said partitions, a rotor element in each of said compartments, a plurality of Parsons' type blading carried by said rotors and interposed between said fixed guide blade sectors and means whereby the working fluid is passed more than once in the same direction through the same rotor blades.

32. A turbine having in combination a casing, partitions dividing said casing into compartments, a plurality of sectors of fixed guide blades of the Parsons' type within each compartment, a rotor element in each compartment, a plurality of rows of Parsons' type blading carried by said rotor and interposed between said fixed guide blades, and means whereby the working fluid after passing once through said guide and rotor blades is again delivered to the same rotating blades and passes through these again and in the same direction as before and finally delivering the fluid to the next compartment.

33. A turbine having in combination a casing, partitions dividing said casing into compartments, a plurality of sectors of fixed guide blades of the Parsons' type within each compartment, a rotor element in each compartment, a plurality of rows of Parsons' type blading carried by said rotor and interposed between said fixed guide blades, and means whereby the working fluid after passing once through said guide and rotor blades is again delivered to the same rotating blades and passes through these again and in the same direction as before and finally delivering the fluid to the next compartment, an annular admission reaction turbine within the same casing and receiving the working fluid exhausted from the last of the compartments.

34. A turbine having in combination a casing, partitions dividing said casing into compartments, a plurality of sectors of fixed guide blades of the Parsons' type within each compartment, a rotor element in each compartment, a plurality of rows of Parsons' type blading carried by said rotor and interposed between said fixed guide blades, and means whereby the working fluid after passing once through said guide and rotor blades is again delivered to the same rotating blades and passes through these again and in the same direction as before finally delivering the fluid to the next compartment, an annular admission turbine of the Parsons' reaction type receiving the fluid exhausted for the last of said compartments.

35. A turbine having in combination a casing, partitions dividing said casing into compartments, a plurality of sectors of fixed guide blades of the Parsons' type within each compartment, a rotor element in each compartment, a plurality of rows of Parsons' type blading carried by said rotor and interposed between said fixed guide blades, said sectors terminating in short end blockings to form one or more impingement zones, and means whereby the working fluid after having passed once through the guide and rotating blades is exhausted freely into the compartment containing the rotor from which compartment the fluid is again delivered to and passes through the same rotating blades in the same direction as before, the fluid thereafter passing to the blades in the next compartment.

36. A turbine having in combination a casing, partitions dividing said casing into compartments, a plurality of sectors of fixed guide blades of the Parsons' type within each compartment, a rotor element in each compartment, a plurality of rows of Parsons' type blading carried by said rotor and interposed between said fixed guide blades, members each having a passage therein whereby the fluid having passed once through the rotating blades is carried up and over these blades to the inlet side thereof and again passed in the same through the same rotating blades and finally delivering the fluid to the next compartment.

37. A turbine having in combination, a casing partitions dividing said casing into compartments, a plurality of sectors of fixed guide blades of the Parsons' type within each compartment, a rotor element in each compartment, a plurality of rows of Parsons' type blading carried by said rotor and interposed between said fixed guide blades, members each having a passage therein whereby the fluid having passed once through the rotating blades is delivered into the rotor compartment and then guided up and over the rotating blades to the inlet thereto and again passed through the same rotating blades in the same direction as before, the fluid thereafter passing to the next compartment.

38. A ship propelling plant in which the high pressure expansion is effected in a turbine comprising a number of stages each of which consists of a plurality of means for fractionally converting the pressure energy of the working fluid into kinetic energy, reaction means interposed between said converting means for transforming said kinetic energy into mechanical energy while further converting said pressure energy into kinetic energy and means whereby the working fluid is passed more than once in the same direction through the same reaction means.

39. Propelling plant for vessels comprising a turbine in which the expansion of the high pressure working fluid is effected, said turbine comprising a number of successive stages each of which comprises a plurality of means for fractionally converting the pressure energy of the working fluid into kinetic energy, reaction means interposed between said converting means for transforming said kinetic energy into mechanical energy while further converting said pressure energy into kinetic energy said converting means only partly extending over said reaction means and terminating in short end blockings to form impingement zones which gradually increase in cross sectional area in the direction of flow of the fluid through the turbine and means whereby the working fluid is passed more than once in the same direction through the same reaction means.

40. Propelling plant for vessels comprising a turbine in which the expansion of the high pressure working fluid is effected, said turbine comprising a number of stages each formed within a common casing, partitions separating each stage into separate chambers, each stage comprising a plurality of means for fractionally converting the pressure energy of the working fluid into kinetic energy, a rotor in each chamber, reaction means carried by said rotor and interposed between said converting means, said reaction means transforming said kinetic energy into mechanical energy while further converting the pressure energy of the fluid into kinetic energy, said converting means extending only over a part of said reaction means and terminating in short end blockings so as to form sections having two or more impingement zones while the sectors are themselves attached to the turbine casing and means whereby the working fluid is passed several times through the same reaction means and in the same direction.

In testimony whereof, I affix my signature in presence of two witnesses.

CHARLES ALGERNON PARSONS.

Witnesses:
FREDERICK GORDON HAY BEDFORD,
ALBERT WILLIAM PARR.